(12) United States Patent
Friberg et al.

(10) Patent No.: US 8,887,669 B2
(45) Date of Patent: Nov. 18, 2014

(54) TREATMENT DEVICE

(75) Inventors: Olof Friberg, Halmstad (SE); Hans Van Der Poel, Roelofarendsveen (NL)

(73) Assignee: Delaval Holding AB, Tumba (SE)

( * ) Notice: Subject to any disclaimer, the term of this patent is extended or adjusted under 35 U.S.C. 154(b) by 668 days.

(21) Appl. No.: 13/121,440

(22) PCT Filed: Sep. 21, 2009

(86) PCT No.: PCT/EP2009/062176
§ 371 (c)(1),
(2), (4) Date: Mar. 29, 2011

(87) PCT Pub. No.: WO2010/040631
PCT Pub. Date: Apr. 15, 2010

(65) Prior Publication Data
US 2011/0174234 A1 Jul. 21, 2011

(30) Foreign Application Priority Data

Oct. 6, 2008 (SE) .................................... 0802097
Oct. 13, 2008 (SE) .................................... 0802185

(51) Int. Cl.
*A01K 13/00* (2006.01)

(52) U.S. Cl.
CPC .................................. *A01K 13/004* (2013.01)
USPC ......................................................... 119/609

(58) Field of Classification Search
CPC .... A01K 13/00; A01K 13/003; A01K 13/004
USPC .................................. 119/600–678
See application file for complete search history.

(56) References Cited

U.S. PATENT DOCUMENTS

| 4,225,995 A | 10/1980 | Ennis |
| 5,970,911 A * | 10/1999 | van der Lely ............... 119/14.03 |
| 5,979,002 A | 11/1999 | Anderson |

(Continued)

FOREIGN PATENT DOCUMENTS

| DE | 19734289 C1 | 11/1998 |
| DE | 100 02 688 A1 | 5/2001 |

(Continued)

OTHER PUBLICATIONS

International Search Report, dated Jan. 22, 2010, from corresponding PCT application.

(Continued)

*Primary Examiner* — Monica Williams
*Assistant Examiner* — Joshua Huson
(74) *Attorney, Agent, or Firm* — Young & Thompson

(57) ABSTRACT

A treatment device for an animal includes a treatment member (1), having a first end and a second end, a longitudinal rotary axis (X) extending through the treatment member and the first and second ends, a driving part connected to the treatment member brings about a rotational movement of the treatment member around the longitudinal rotary axis. A carrying member (2) carries the treatment member and the driving part. An anchorage member (4) anchors the carrying member to a stationary element. The carrying member includes a first pivotable connection (3), permitting the treatment member to swing about a first axis (Y), and a second pivotable connection (5), permitting the treatment member to swing about a second axis (Z). The second pivotable connection is provided laterally closer to the anchorage member than to the first pivotable connection.

17 Claims, 3 Drawing Sheets

(56) References Cited

U.S. PATENT DOCUMENTS

| | | | |
|---|---|---|---|
| 6,318,298 B1 | 11/2001 | Nonay | |
| 2002/0124809 A1* | 9/2002 | Verburg et al. | 119/516 |
| 2003/0209209 A1* | 11/2003 | Udelle et al. | 119/609 |
| 2007/0000450 A1* | 1/2007 | Otten | 119/609 |

FOREIGN PATENT DOCUMENTS

| | | |
|---|---|---|
| EP | 0 287 176 A1 | 10/1988 |
| EP | 1 665 927 A2 | 6/2006 |
| GB | 894440 A | 4/1962 |
| KR | 100728663 B1 | 6/2007 |
| SU | 1588335 A1 | 8/1990 |
| WO | 03/084316 A1 | 10/2003 |
| WO | 2009110828 A1 | 9/2009 |

OTHER PUBLICATIONS

Supplementary International Search Report, dated Jan. 27, 2011, from corresponding PCT application.

Notice of Opposition, dated Dec. 10, 2013, filed in the corresponding EP application.

Russian Office Action, dated Sep. 24, 2013, from corresponding RU application.

* cited by examiner

FIG. 4
FIG. 5
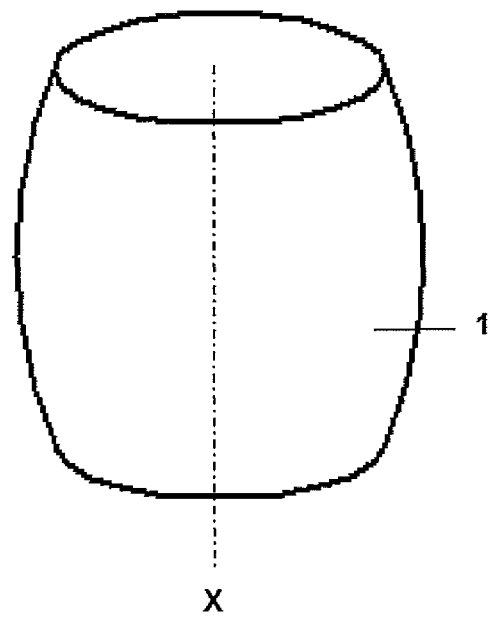
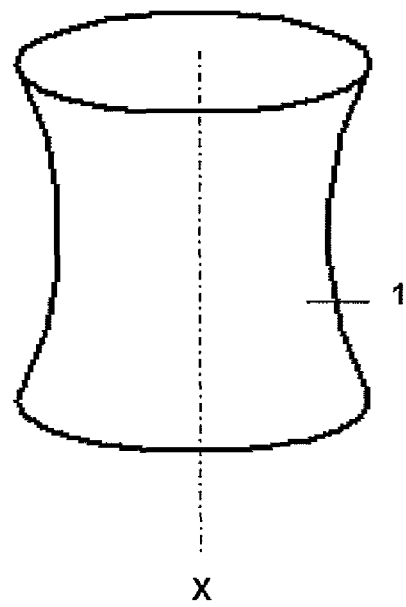
FIG. 6
FIG. 8
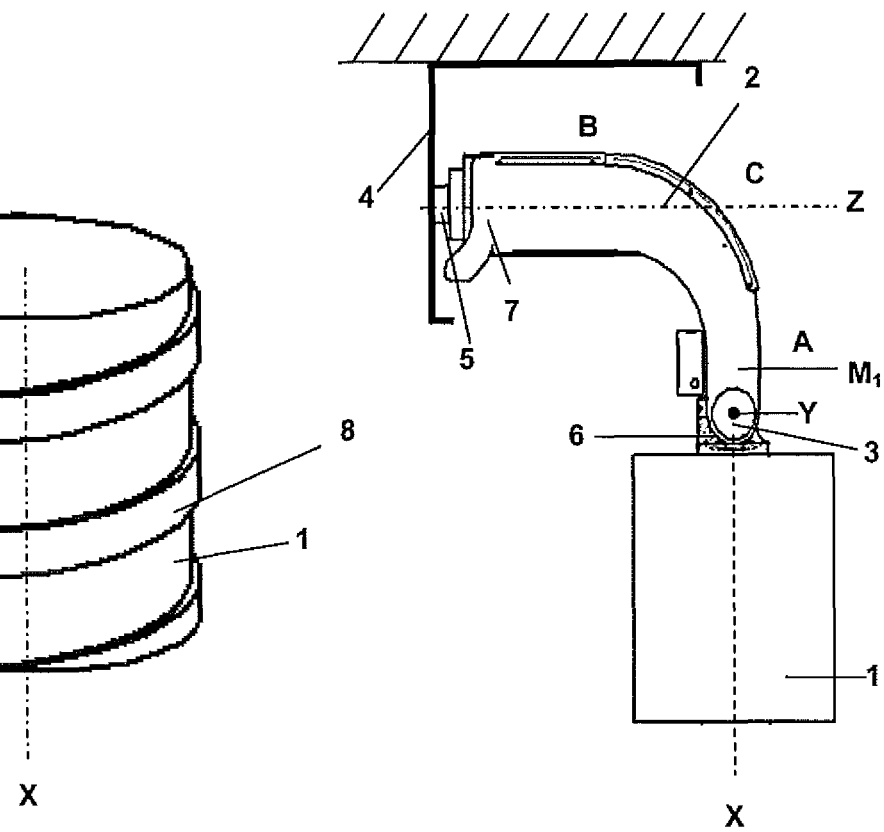

TREATMENT DEVICE

BACKGROUND OF THE INVENTION AND PRIOR ART

The present invention concerns a treatment device for treating an animal, wherein the treatment device comprises a treatment member, having a first end and a second end, wherein a longitudinal rotary axis extends through the treatment member and the first and the second ends, driving means connected to the treatment member, wherein the driving means is arranged to bring about a rotational movement of the treatment member around the longitudinal rotary axis, a carrying member for carrying the treatment member and the driving means, and an anchorage member arranged to anchor the carrying member to a stationary element, wherein the carrying member comprises a first pivotal connection permitting the treatment member to swing about a first axis, and wherein the carrying member is further connected to the anchorage member by means of a second pivotal connection, the second pivotal connection permitting the treatment member to swing about a second axis There are known several treatment devices for animals from the prior art. One application of a treatment device can involve brushing of the animal. The brushing is a way of keeping the animal clean, giving the animal massage and calming it down. Sometimes the brushing can also be used for applying insecticides to the fur. The brushing is also a way of improving the health of the animal and to provide for an increased feeling of well-being and comfort.

U.S. Pat. No. 6,318,298 B1 discloses a treatment device wherein a brush is mounted in a horizontal direction. The brush is vertically movable and thereby is adjustable to suit animals of different heights. A motor is connected to the brush to bring about a rotation, wherein the motor is activated when the animal presses against the brush. Also the height of the brush is adjusted when the animal presses against the brush. Since the brush is horizontal it can only reach the back and upper horizontal surfaces of the animal.

WO 03/084316 A1 discloses a treatment device for livestock wherein an oblong brush is carried by a carrying means. The brush can be set in a preferably rotating motion by a drive unit. The motion is initiated by the animal coming into contact with the brush. Moreover, by means of a flexible element in the carrying means, the brush is able to swivel from a vertical to a substantially horizontal orientation upon a force acting on it. The treatment device is especially suitable for large animals such as cows and horses.

SUMMARY OF THE INVENTION

A purpose of the present invention is to provide a treatment device which provides a more preferable swinging movement of the treatment member and to achieve a more efficient treating, brushing and cleaning operation of the animal.

This purpose is obtained with the initially defined treatment device, which is characterised in that the second pivotal connection is provided laterally closer to the anchorage member than to the first pivotal connection.

By such a treatment device it is possible for an animal that uses the treatment device to let itself be treated in an efficient and comfortable way. Owing to the construction and preferably smooth design of the treatment device, the treatment of the animal can be carried out in a more controlled and disciplined way. The new construction of the treatment device according to the present invention contributes to softer swinging movements of the carrying member and the treatment member. The softer swinging movements of the treatment device are appreciated by the animal. The animal experiences a feeling of well-being, which improves the health and comfort of the animal. The treatment device is preferably intended to be used by larger bovine animals.

According to an embodiment of the invention, the second pivotal connection is provided on only one side of and at a distance from the longitudinal rotary axis when the treatment member is in a substantially vertical position.

According to an embodiment, the second axis extends substantially horizontally.

According to an embodiment, the second pivotal connection is arranged to permit the carrying member to swing about the second axis, thereby permitting the treatment member to swing about the second axis.

According to an embodiment, the second pivotal connection is arranged to permit the carrying member to swing at least 220° about the second axis. The carrying member can swing in either direction from a starting position, resulting in a total swing angle of at least 220°, as mentioned above. It may even be possible for the carrying member to swing freely 360° about the second axis.

According to an embodiment, the first axis is substantially perpendicular or perpendicular to the second axis. The treatment member can by this construction advantageously swing in many directions which brings flexibility to the treatment device. The treatment device will accordingly be useful for animals of different heights and sizes, and will be able to treat the animal on a substantial part of its body. It also contributes to the independency of the animal since the flexibility of the treatment device makes it easier for the animal to utilize the treatment device on desired body parts.

According to an embodiment, the carrying member comprises a first end, at which first end the first pivotal connection is located, and a second end, at which second end the second pivotal connection is located.

According to an embodiment, the carrying member has an L-shape, comprising a first leg portion and a second leg portion, the first leg portion comprising the first end of the carrying member, and the second leg portion comprising the second end of the carrying member, and wherein the first and the second leg portions form an angle. The first and the second leg portions are preferably connected by an intermediate portion. This intermediate portion can have different shapes and can for example be smoothly curved. It can also consist of several small portions, forming a right-angled or an angularly bent intermediate portion.

According to an embodiment, the angle formed by the first and the second leg portions is approximately 90°. Although the intermediate portion does not have to be right-angled, the two leg portions are positioned approximately in a right-angle with respect to each other.

According to an embodiment, the L-shape of the carrying member is smoothly curved. The carrying member is preferably uniformly curved, resulting in a convenient and practical design.

According to an embodiment, the carrying member has a square, circular or oval cross-section.

According to an embodiment, the driving means comprises a rotation motor, arranged to bring about the rotational movement. The rotation motor is preferably a standard type electric motor, comprising a stator and a rotor, and is advantageously connected to the treatment member via a gear box.

According to an embodiment, the treatment member comprises a brush. The brush preferably comprises stiff and hard bristle-like elements. The bristle-like elements may extend outwardly with respect to the longitudinal rotary axis and are capable of providing both a firm massaging effect and a cleaning effect of an animal that uses the treatment device. It is also envisaged to combine bristle-like elements differing in stiffness on one treatment member, at least some of these bristle-like elements are hard and extend outwardly with respect to the longitudinal rotary axis.

According to an embodiment, the treatment device comprises a third pivotal connection arranged to permit the treatment member to swing about a fourth axis. The fourth axis may extend substantially in parallel, or in parallel, with the second axis.

The treatment member may be of a more general design such as a rotary body having projections of any suitable shape, such as warts, extending outwardly with respect to the longitudinal rotary axis. These projections may thus comprise other elements than the above described bristle-like elements. For example, the projections may be comprised of a sponge-like element or softer hair-like elements. Furthermore, the entire rotary body may be formed of a sponge-like element.

BRIEF DESCRIPTION OF THE DRAWINGS

FIG. 1b shows a schematic side view slightly from above of the treatment device according to FIG. 1a.

FIG. 4 shows a schematic view of a second variant of a treatment member of the treatment device.

FIG. 5 shows a schematic view of a third variant of a treatment member of the treatment device.

FIG. 6 shows a schematic view of a fourth variant of a treatment member of the treatment device.

FIG. 8 shows a schematic side view of a fifth embodiment of a treatment device according to the invention.

DETAILED DESCRIPTION OF VARIOUS EMBODIMENTS OF THE INVENTION

Figure 1A:
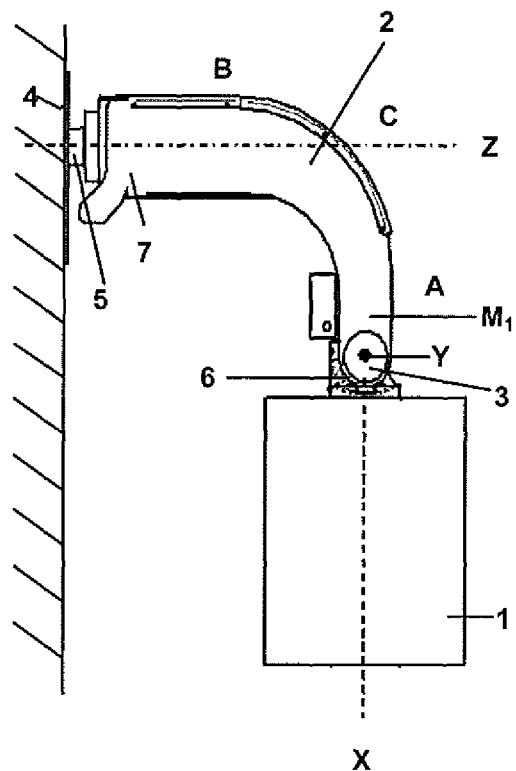
FIG. 1a shows a schematic side view of a first embodiment of a treatment device according to the invention.

It is to be noted that elements having the same function have been designated with the same reference signs in all embodiments.

A first embodiment of a treatment device will now be described with reference to FIG. 1a. The treatment device comprises driving means including a standard type electric rotation motor $M_1$, which is connected to a treatment member 1. The treatment member 1 is rotatable around a longitudinal rotary axis X. The treatment member 1 is further connected to a carrying member 2 via a first pivotal connection 3. The carrying member 2 is connected to an anchorage member 4 via a second pivotal connection 5. The second pivotal connection 5 is provided at a distance from the longitudinal rotary axis X, and on only one side of the longitudinal rotary axis X when the treatment member is in a substantially vertical position. The anchorage member 4 is mounted to a wall or a side post (not shown).

The carrying member 2 comprises a first end 6 and a second end 7. The first pivotal connection 3 is located at the first end 6 and the second pivotal connection 5 is located at the second end 7. Furthermore, the carrying member 2 comprises a first leg portion A and a second leg portion B. The first leg portion A comprises the first end 6 and the second leg portion B comprises the second end 7. The first leg portion A forms an angle of approximately 90° with the second leg portion B.

The carrying member 2 may be designed in various ways. An example of a design of the carrying member 2 is schematically indicated in FIG. 1a, where the carrying member 2 has a smoothly curved L-shape. Furthermore, in this first embodiment the carrying member 2 has a square cross section.

The first and the second leg portions A, B are connected by an intermediate portion C. The intermediate portion C is smoothly curved, contributing to the smoothly curved L-shape of the carrying member 2.

The first pivotal connection 3 enables the treatment member 1 to swing about a first axis Y. The second pivotal connection 5 is arranged to permit the carrying member 2 to swing about a second axis Z, extending substantially horizontally. By permitting the carrying member 2 to swing about the second axis Z, the second pivotal connection 5 enables also the treatment member 1 to swing about the second axis Z. The first axis Y is perpendicular to the second axis Z, resulting in advantageous flexible movements of the treatment member 1.

When the treatment device is not used by an animal, it is in a rest position, as shown in FIG. 1a. In the rest position the longitudinal rotary axis X of the treatment member 1 is parallel to a vertical axis V. Furthermore, the first leg portion A of the carrying member 2 is in the rest position also parallel to the vertical axis V. The second leg portion B is parallel to the second axis Z, the second axis Z being perpendicular to the vertical axis V.

When an animal comes into contact with the treatment device, the rotation motor $M_1$ starts to rotate the treatment member 1 along the longitudinal rotary axis X. The rotation will be at an animal friendly speed, such as 3-35 rpm, for example about 22 rpm. Furthermore, the animal can independently control the treatment member 1 to swing in a desired direction. The second pivotal connection 5 is arranged to permit the carrying member 2 to swing at least 220° about the second axis Z. In other words, the carrying member 2 is able to swing at least 110° in either direction about the second axis Z, with respect to the rest position.

The treatment device may comprise control and sensor means (not shown) controlling the rotation motor $M_1$ to start rotate when an animal approaches or contacts the treatment member 1, to continue the movement of the treatment member 1 as long as the treatment member 1 is in contact with the animal, and to stop the movement at a certain time period after the animal has lost contact with the treatment member 1.

The treatment member 1 of this first embodiment is shaped as a circular cylinder. Furthermore, the treatment member 1 comprises a brush (not shown). The brush is formed by bristle-like elements extending outwardly with respect to the longitudinal rotary axis X. The bristle-like elements have a length of about 5-35 cm. The bristle-like elements are preferably stiff and hard, facilitating the brushing and cleaning of the animal, as well as contributing to a massaging and blood stimulating effect.

Figure 1B:
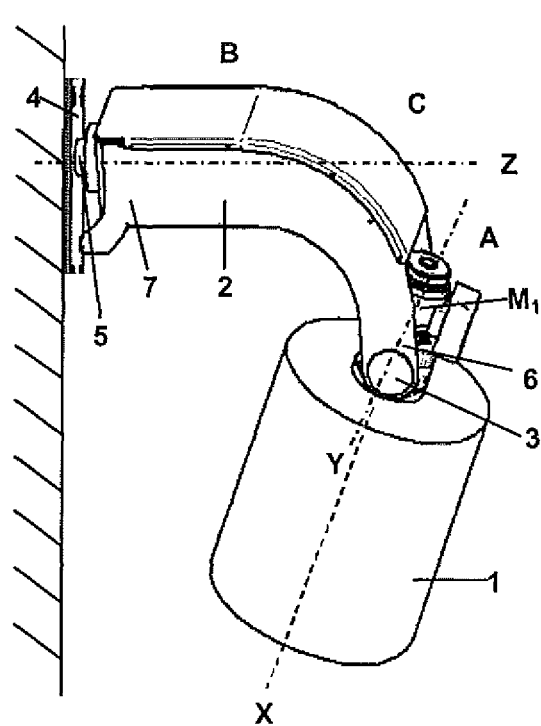

FIG. 1b is illustrating the treatment device of FIG. 1a but differs from FIG. 1a in that the treatment device is not in the rest position. The treatment member 1 has swung about the first axis Y and the longitudinal rotary axis X is not parallel to the vertical axis V. Furthermore, the carrying member 2 has swung about the second axis Z, whereby also the treatment member 1 has swung about the sec- and axis Z.

Figure 2:
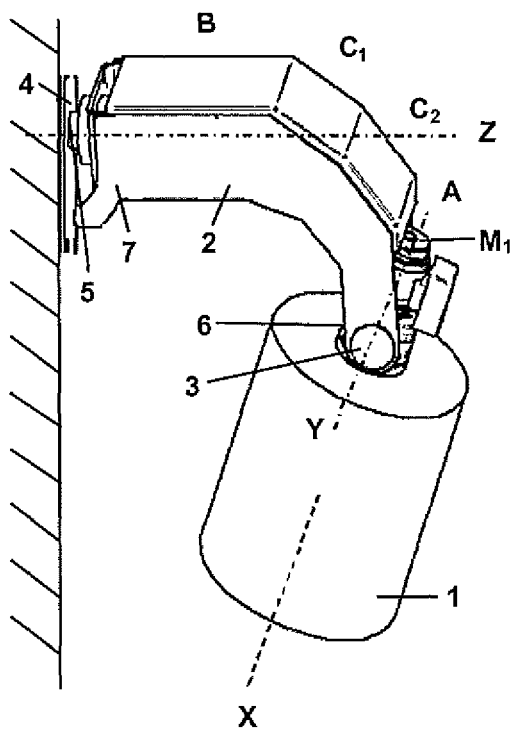
FIG. 2 shows a schematic side view of a second embodiment of a treatment device according to the invention.

FIG. 2 discloses a second embodiment of the kind disclosed in FIG. 1b of the first embodiment which differs from the first embodiment in that the intermediate portion C is angularly bent, consisting of two small straight, or substantially straight, portions, $C_1$ and $C_2$.

Figure 3:
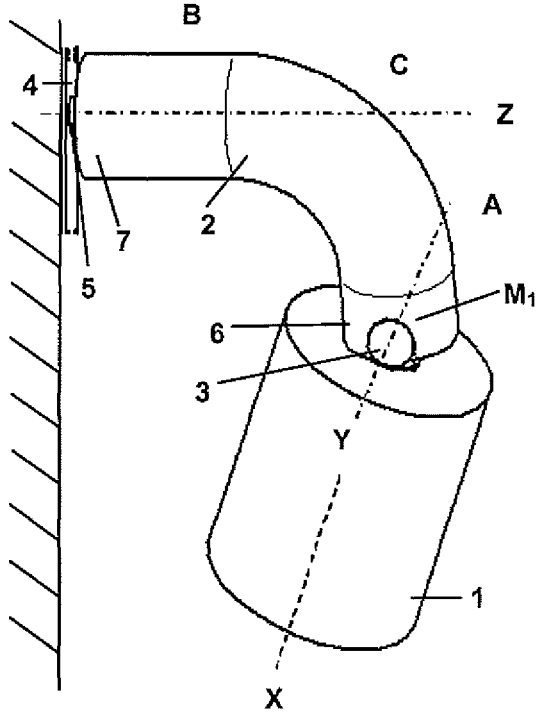
FIG. 3 shows a schematic side view of a third embodiment of a treatment device according to the invention.

FIG. 3 discloses a third embodiment of the kind disclosed in FIG. 1b of the first embodiment which differs from the first embodiment in that the cross section of the carrying member 2 is circular.

FIG. 4 discloses a second variant of the treatment member 1, wherein the treatment member 1 is shaped as a convex cylinder. The central parts of the convex cylinder have larger diameters than the end parts of the cylinder. Furthermore, the treatment member 1 comprises a brush (not shown). The brush is formed by bristle-like elements extending outwardly with respect to the longitudinal rotary axis X. The bristle-like elements have a length of about 5-35 cm. The bristle-like elements are preferably stiff and hard, facilitating the brushing and cleaning of the animal, as well as contributing to a massaging and blood stimulating effect.

FIG. 5 discloses a third variant of the treatment member 1, wherein the treatment member 1 is shaped as a concave cylinder. The central parts of the concave cylinder have smaller diameters than the end parts of the cylinder. Furthermore, the treatment member 1 comprises a brush (not shown). The brush is formed by bristle-like elements extending outwardly with respect to the longitudinal rotary axis X. The bristle-like elements have a length of about 5-35 cm. The bristle-like elements are preferably stiff and hard, facilitating the brushing and cleaning of the animal, as well as contributing to a massaging and blood stimulating effect.

FIG. 6 discloses a fourth variant of the treatment member 1, wherein the treatment member 1 is shaped as a circular cylinder. The treatment member 1 comprises an active surface 8. The active surface 8 forms a brush which is formed by bristle-like elements extending outwardly with respect to the longitudinal rotary axis X. The active surface 8 is extending along a helical path around the treatment member 1. The bristle-like elements have a length of about 5-35 cm. The bristle-like elements are preferably stiff and hard, facilitating the brushing and cleaning of the animal, as well as contributing to a massaging and blood stimulating effect.

Figure 7:
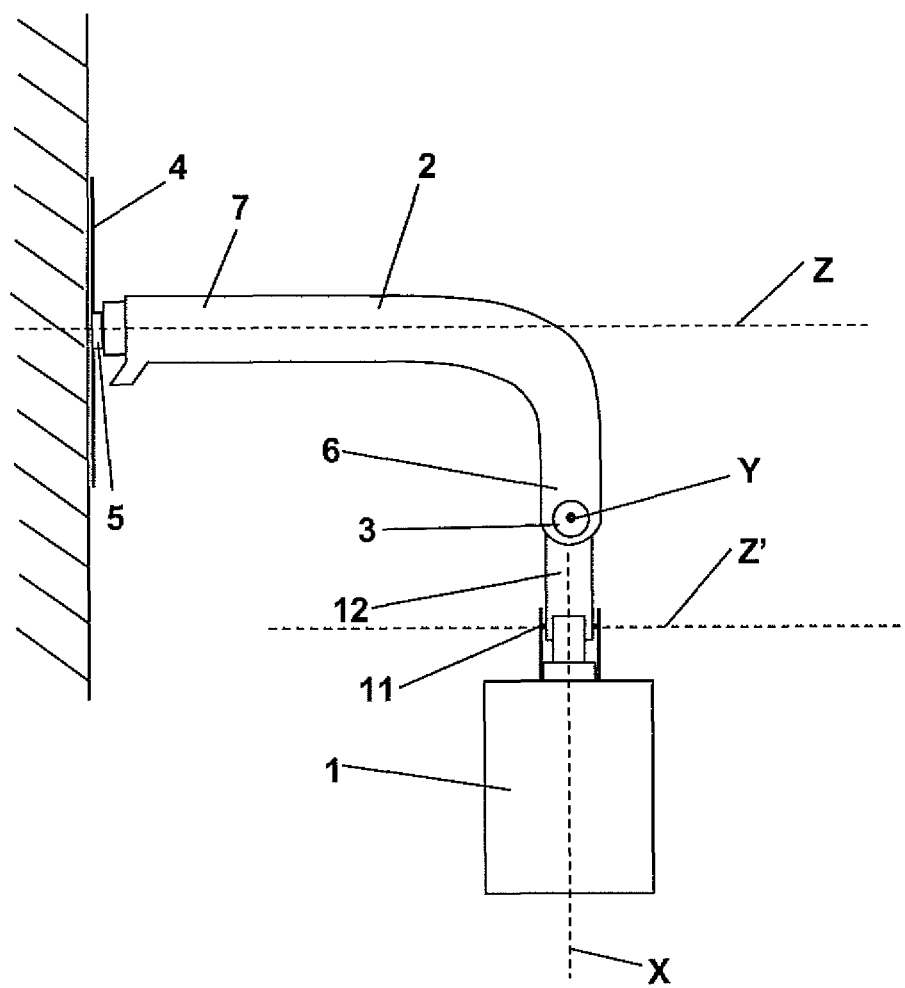
FIG. 7 shows a schematic side view of a fourth embodiment of a treatment device according to the invention.

FIG. 7 discloses a fourth embodiment of the treatment device, which differs from the other embodiments in that treatment device comprises a third pivotal connection 11 arranged to permit the treatment member 1 to swing about a fourth axis Z'. An additional link member 12 is provided between the second end 6 of the carrying member 2 and the treatment member 1. The first pivotal connection 3 is the provided between the second end 6 of the carrying member 2 and a first, upper, end of the additional link member 12. The third pivotal connection 11 is provided between the treatment member 1 and a second, lower, end of the additional link 12. The fourth axiz Z' extends, in the embodiment disclosed in FIG. 7, in parallel, or substantially in parallel, with the second axis Z. The fourth axiz Z' is displaced in relation to the second axis Z, wherein the third axis Y extends between the first axiz Z and the fourth axis Z'.

In this embodiment, the treatment member 1 may thus swing about four axes, so that an even more soft and flexible movement of the treatment member 1 is achieved. The treatment member 1 may thus follow the contour of an animal in a very advantageous manner. It is to be noted that the treatment device also may include further pivotal connections so that the treatment member may be arranged to swing about more than four axes, e.g. five or six axes.

The carrying member can be designed in other ways from what is described above. For example, it can have a true L-shape, wherein the intermediate portion C consists of two small straight, or substantially straight, portions that are perpendicularly joined, forming an angle of approximately 90°. The cross section of the carrying member may also have different shapes, such as a circular or square shape as mentioned above, or an oval or multisided shape.

The anchorage member of the treatment device is arranged to anchor the carrying member to a stationary object such as a ceiling, a post or a vertical or inclined wall, and it can be anchored indoors or outdoors. The anchoring can be facilitated by pre-mounting the treatment device. If the device is correctly placed it promotes the use of the device and stops animals from hurting themselves. When an animal needs to scratch itself it may namely hurt itself by scratching on for example a sharp edge. Additionally, by placing the device in the right space it promotes the animal traffic and guides the animals between a feeding area and a resting area. In the disclosed embodiments the treatment member is movable in many directions and thereby a large surface of the animal can be reached.

FIG. 8 is illustrating a fifth embodiment of the treatment device which differs from the first embodiment in that the anchorage member 4 is designed to permit mounting to a ceiling. Mounting the treatment device to a ceiling can be preferable if no walls are available or if there is not enough space for the treatment device to be mounted to a wall. Furthermore, treatment devices may be mounted both to a wall and to a ceiling, providing further options for the animals.

The present invention is not limited to the shown embodiments but can be varied and modified within the scope of the following claims.

The invention claimed is:

1. A treatment device for an animal, comprising:
a treatment member (1) having a first end and a second end,
   a longitudinal rotary axis (X) of the treatment member extending through the first and the second ends of the treatment member,
in a rest position of the treatment member, the longitudinal rotary axis (X) defining a first axis (X);
a driving part (M1) connected to the treatment member (1), in operation the driving part rotating the treatment member (1) around the longitudinal rotary axis (X);
a carrying member (2) comprised of i) a first leg (A) extending along the first axis (X), ii) a second leg (B) with a longitudinal length extending along a second axis (Z) and rotational along the second axis (Z), and iii) an intermediate portion (C);
a first pivotable connection (3) located at a first end (6) of the first leg (A), the treatment member (1) connected to the carrying member (2) via the first pivotable connection (3), the first pivotable connection (3) enabling the treatment member (1) to swing about a third axis (Y);
a second pivotable connection (5) located at a first end (7) of the second leg (B), the second pivotable connection (5) arranged to permit the carrying member (2) to swing about the second axis (Z),
the intermediate portion connecting a second end of the first leg to a second end of the second leg; and
an anchorage member (4) for anchoring the second pivotable connection (5) to a stationary element, the first end (7) of the second leg (B) of the carrying member (2) connected to the anchorage member (4) via the second pivotable connection (5),
wherein the second pivotable connection (5) is provided at a distance from the first axis (X) of the treatment member (1), and on only one side of the first axis (X) of the treatment member, when the treatment member is in a substantially vertical position.

2. The treatment device for an animal of claim 1, wherein the second pivotable connection (5) is located laterally closer to the anchorage member (4) than to the first pivotable connection (3).

3. The treatment device for an animal of claim 1, wherein the second axis (Z) extends substantially horizontally.

4. The treatment device for an animal of claim 1, wherein the second pivotable connection (5) is arranged to permit the carrying member (2) to swing at least 220° about the second axis (Z).

5. The treatment device for an animal of claim 1, wherein the first axis (X) is substantially perpendicular to the second axis (Z).

6. The treatment device for an animal of claim 5, wherein the third axis (Y) is substantially perpendicular to the second axis (Z).

7. The treatment device for an animal of claim 6, wherein an angle between the first leg and the second leg is approximately 90°.

8. The treatment device for an animal of claim 6, wherein the L-shape of the carrying member (2) is smoothly curved.

9. The treatment device for an animal of claim 1, wherein the carrying member (2) has an L-shape.

10. The treatment device for an animal of claim 1, wherein the carrying member (2) has one of a square cross-section, a circular cross-section, and an oval cross-section.

11. The treatment device for an animal of claim 1, wherein the driving part comprises a rotation motor ($M_1$) arranged to bring about the rotating of the treatment member.

12. The treatment device for an animal of claim 1, wherein the treatment member (1) comprises a brush.

13. The treatment device for an animal of claim 1, further comprising a third pivotable connection (11) arranged to permit the treatment member (1) to swing about a fourth axis (Z').

14. The treatment device for an animal of claim 13, wherein the fourth axis (Z') extends substantially in parallel with the second axis (Z).

15. The treatment device for an animal of claim 13, wherein the third pivotable connection is located between the first end (6) of the first leg (A) and the treatment member (1).

16. A treatment device for an animal, comprising:
- a treatment member (1) having a first end and a second end, a longitudinal rotary axis (X) of the treatment member extending through the first and the second ends of the treatment member,
- in a rest position, the longitudinal rotary axis (X) of the treatment member defining an X axis of an X-Y-Z Cartesian coordinate system, the X axis extending substantially vertically;
- a driving part (M1) connected to the treatment member (1), in operation the driving part rotating the treatment member (1) around the longitudinal rotary axis (X);
- a carrying member (2) comprised of i) a first leg (A) extending along the X axis of the X-Y-Z Cartesian coordinate system, ii) a second leg (B) with a longitudinal length extending along, and rotational about, a Z axis of the X-Y-Z Cartesian coordinate system, and iii) an intermediate portion (C);
- a first pivotable connection (3) located at a first end of the first leg, the treatment member (1) connected to the carrying member (2) via the first pivotable connection (3), the first pivotable connection (3) enabling the treatment member (1) to swing about a Y axis of the X-Y-Z Cartesian coordinate system;
- a second pivotable connection (5) located at a first end of the second leg, the second pivotable connection (5) arranged to permit the carrying member (2) to swing about the Z axis of the X-Y-Z Cartesian coordinate system, the Z axis extending substantially horizontally,
- the intermediate portion connecting a second end of the first leg to a second end of the second leg; and
- an anchorage member (4) for anchoring the second pivotable connection (5) to a stationary element, the second leg of the carrying member (2) connected to the anchorage member (4) via the second pivotable connection (5).

17. A treatment device for an animal, comprising:
- a treatment member (1) having a first end and a second end, a longitudinal rotary axis (X) of the treatment member extending through the first and the second ends of the treatment member;
- a driving part (M1) connected to the treatment member (1), in operation the driving part rotating the treatment member (1) around the longitudinal rotary axis (X);
- a carrying member (2) comprised of i) a first leg (A) with a first end (6) and a second end, ii) a second leg (B) with a first end (7) and a second end, the second leg (B) having a longitudinal length extending along a second axis (Z) between the first end (7) of the second leg and the second end of the second leg and being rotational along the second axis (Z), the second axis (Z) being non-parallel to the longitudinal rotary axis (X) of the treatment member, and iii) an intermediate portion (C) connecting the second end of the first leg to the second end of the second leg,
- the treatment member (1) connected to the carrying member (2) via the first leg (A);
- a first pivotable connection (3) located on the first leg (A), the first pivotable connection (3) enabling the treatment member (1) to swing about a third axis (Y), the third axis (Y) being non-parallel to both the second axis (Z) and the longitudinal rotary axis (X) of the treatment member;
- a second pivotable connection (5) located on the second leg (B), the second pivotable connection (5) arranged to permit the carrying member (2) to swing about the second axis (Z); and
- an anchorage member (4) for anchoring the first end (7) of the second leg (B) of the carrying member (2) to a stationary element,
- wherein the second pivotable connection (5) is located laterally along the second axis (Z) closer to first end (7) of the second leg than to the second end of the second leg.

* * * * *